(12) United States Patent
Kim (10) Patent No.: US 8,087,911 B2
(45) Date of Patent: Jan. 3, 2012

(54) PUMP OF ELECTRONICALLY CONTROLLED BRAKE SYSTEM

(75) Inventor: Yong Kap Kim, Daejeon (KR)

(73) Assignee: Mando Corporation, Gyeonggi-do (KR)

( * ) Notice: Subject to any disclaimer, the term of this patent is extended or adjusted under 35 U.S.C. 154(b) by 245 days.

(21) Appl. No.: 12/482,208

(22) Filed: Jun. 10, 2009

(65) Prior Publication Data

US 2009/0246052 A1 Oct. 1, 2009

Related U.S. Application Data

(62) Division of application No. 12/043,449, filed on Mar. 6, 2008, now abandoned.

(30) Foreign Application Priority Data

| Apr. 9, 2007 | (KR) | 10-2007-0034696 |
| Apr. 9, 2007 | (KR) | 10-2007-0034707 |
| Apr. 9, 2007 | (KR) | 10-2007-0034715 |

(51) Int. Cl.
*F04B 39/10* (2006.01)
(52) U.S. Cl. ......... 417/545; 417/454; 417/570; 137/539
(58) Field of Classification Search .................. 417/454, 417/570, 545, 364, 470–472, 540; 138/30, 138/26; 137/539, 454.6, 454.4
See application file for complete search history.

(56) References Cited

U.S. PATENT DOCUMENTS

| 6,394,770 | B1 * | 5/2002 | Siegel et al. | 417/470 |
| 6,471,496 | B1 * | 10/2002 | Merklein et al. | 417/569 |
| 7,278,835 | B2 | 10/2007 | Schmitt et al. | 417/470 |
| 2003/0053920 | A1 * | 3/2003 | Hinz et al. | 417/470 |
| 2004/0113487 | A1 | 6/2004 | Yang | 303/116.4 |
| 2004/0166004 | A1 * | 8/2004 | Schmitt et al. | 417/470 |
| 2005/0112005 | A1 | 5/2005 | Yang | 417/470 |

FOREIGN PATENT DOCUMENTS

| DE | 10346237 A1 | 9/2004 |
| WO | 99/40323 A1 | 8/1999 |

OTHER PUBLICATIONS

United States Office Action issued in U.S. Appl. No. 12/482,192, mailed Oct. 25, 2010.
United States Notice of Allowance issued in U.S. Appl. No. 12/482,192 dated Apr. 4, 2011.

* cited by examiner

*Primary Examiner* — Charles Freay
*Assistant Examiner* — Todd D Jacobs
(74) *Attorney, Agent, or Firm* — McDermott Will & Emery LLP (57) ABSTRACT

A pump of an electronically controlled brake system. The pump includes a bore formed in a modulator block and connected with a suction port and a discharge port, a piston installed in the bore in a reciprocating movable manner and defining an inlet path therein, an inlet valve to open or close an exit-side end of the inlet path according to a position of the piston, and an outlet valve provided at one side of the bore, operations of the inlet and outlet valves being contrary to each other. The outlet valve includes a valve seat, a sleeve to surround the valve seat, an outlet ball interposed between the sleeve and the valve seat and used to open or close a path defined in the valve seat, and a valve cap provided at one side of the sleeve to isolate an interior from an exterior of the bore. One or more of the valve sheet, sleeve, and valve cap are formed by press-forming, to achieve improved assembly efficiency and reduced manufacturing costs.

11 Claims, 9 Drawing Sheets

PUMP OF ELECTRONICALLY CONTROLLED BRAKE SYSTEM

BACKGROUND OF THE INVENTION

1. Field of the Invention

The present invention relates to a pump of an electronically controlled brake system, and, more particularly, to a pump of an electronically controlled brake system in which an outlet valve has a simplified configuration, thereby achieving a reduction in manufacturing costs.

2. Description of the Related Art

In general, an electronically controlled brake system has the purpose of efficiently preventing a wheel slip caused upon braking, quick start, or sudden acceleration of a vehicle. The brake system includes a plurality of solenoid valves to control a braking hydraulic pressure to be transmitted to hydraulic brakes of vehicle wheels, a pair of low-pressure and high-pressure accumulators to temporarily store an oil discharged from the hydraulic brakes, a pair of pumps provided between the low-pressure and high-pressure accumulators, the pumps being operated by a motor, and an ECU to control operations of the solenoid valves and motor. All the above elements are received in a modulator block made of aluminum.

In a vehicle having the above-described electronically controlled brake system, a braking force is selectively applied to a front axle or rear axle to regulate the hydraulic pressure to be transmitted to the wheel brakes, resulting in traveling stability of the vehicle. In this case, the pair of pumps serves to forcibly pump the low-pressure oil stored in the low-pressure accumulator to the high-pressure accumulator, so as to transfer the oil to the hydraulic brakes or master cylinder.

Figure 1:
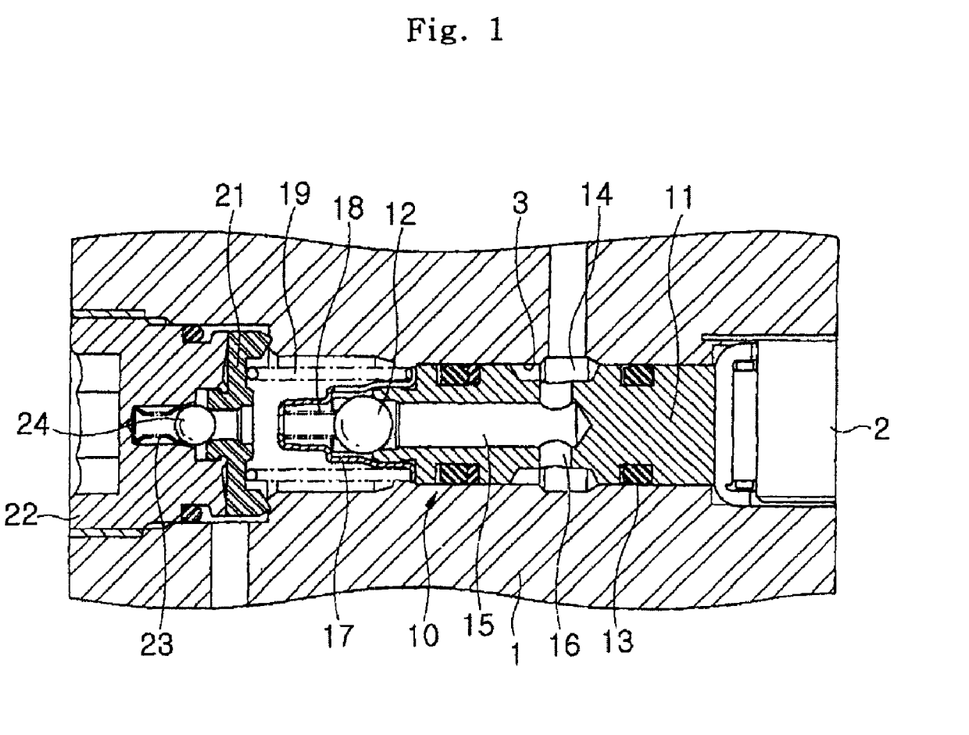
FIG. 1 is a sectional view showing a conventional pump of an electronically controlled brake system.

FIG. 1 is a sectional view showing a conventional pump of an electronically controlled brake system.

As shown in FIG. 1, the pump, which is designated by reference numeral 10, is installed in a block 1 that incorporates an oil passage and a variety of valves. An eccentric motor 2 is installed in the center of the block 1 and generates an eccentric rotating force. A bore 3 for installation of elements of the pump 10 is also formed in the block 1.

A piston 11 is installed in the bore 3, to perform rectilinear reciprocation using the eccentric force supplied from the eccentric motor 2.

The piston 11 has one end in contact with an outer circumference of an eccentric bearing (not designated by a reference numeral) of the eccentric motor 2, and the other end of the piston 11 is provided with a ball-shaped inlet valve 12.

An O-ring 13, as a seal, is fitted on an outer circumference of the piston 11. Also, an inlet path 14 for introduction of oil from a low-pressure accumulator is defined at the outer circumference of the piston 11.

The piston 11 has a hollow inner space 15, and a duct 16 is formed in the piston 11 to connect the hollow inner space 15 and the inlet path 14 with each other.

Here, the inlet valve 12 and piston 11 are elastically supported by a supporting spring 17, an entrance-side spring 18, and a return spring 19.

An outlet valve is provided at an end of the return spring 19 opposite to the inlet valve 12. The outlet valve includes an exit-side valve seat 21, a pump plug 22 caulked to the exit-side valve seat 21, and a ball-shaped closing member 24 supported in the pump plug 22 by means of an exit-side spring 23.

However, in the above-described conventional pump of an electronically controlled brake system, due to a complicated configuration of the outlet valve, in particular, of the valve seat 21, pump plug 22, etc., there is a problematic increase in manufacturing costs required for processing and assembly of the above elements.

Further, the conventional pump suffers from operation noise caused by pulsation of fluid that flows through an outlet path according to opening/closing operations of the outlet valve. The fluid pulsation also results in abnormal tactile feedback from a brake pedal.

SUMMARY OF THE INVENTION

Accordingly, it is an aspect of the invention to provide a pump of an electronically controlled brake system, which can achieve an improved formability and reduced manufacturing costs.

It is a further aspect of the invention to provide a pump of an electronically controlled brake system, which can reduce pulsation of fluid that flows through a discharge valve, thereby reducing operation noise thereof and improving tactile feedback from a brake pedal.

Additional aspects and/or advantages of the invention will be set forth in part in the description which follows and, in part, will be obvious from the description, or may be learned by practice of the invention.

In accordance with the invention, the above and/or other aspects can be achieved by the provision of a pump of an electronically controlled brake system comprising: a bore formed in a modulator block and connected with a suction port and a discharge port; a piston installed in the bore in a reciprocating movable manner and defining an inlet path therein; an inlet valve to open or close an exit-side end of the inlet path according to a position of the piston; and an outlet valve provided at one side of the bore, operations of the inlet and outlet valves being contrary to each other, wherein the outlet valve comprises: a valve seat; a sleeve to surround the valve seat; an outlet ball interposed between the sleeve and the valve seat and used to open or close a path defined in the valve seat; and a valve cap provided at one side of the sleeve to isolate an interior from an exterior of the bore.

The sleeve may be formed by press-forming.

The valve seat or valve cap may be formed by press-forming.

The sleeve may comprise an orifice to reduce pulsation of fluid.

The outlet valve may further comprise a return spring to provide an elastic restoring force to the outlet ball, and the sleeve may comprise a guide to guide the return spring.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
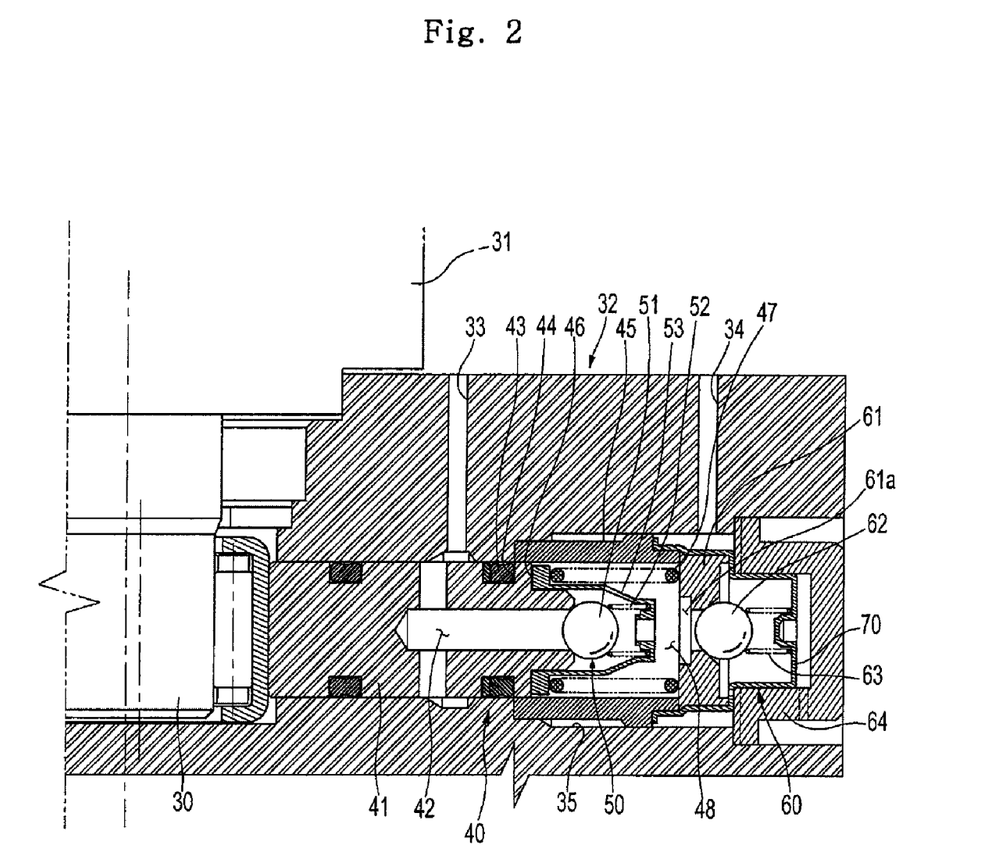
FIG. 2 is a sectional view showing a pump of an electronically controlled brake system in accordance with a first embodiment of the present invention.
Figure 3:
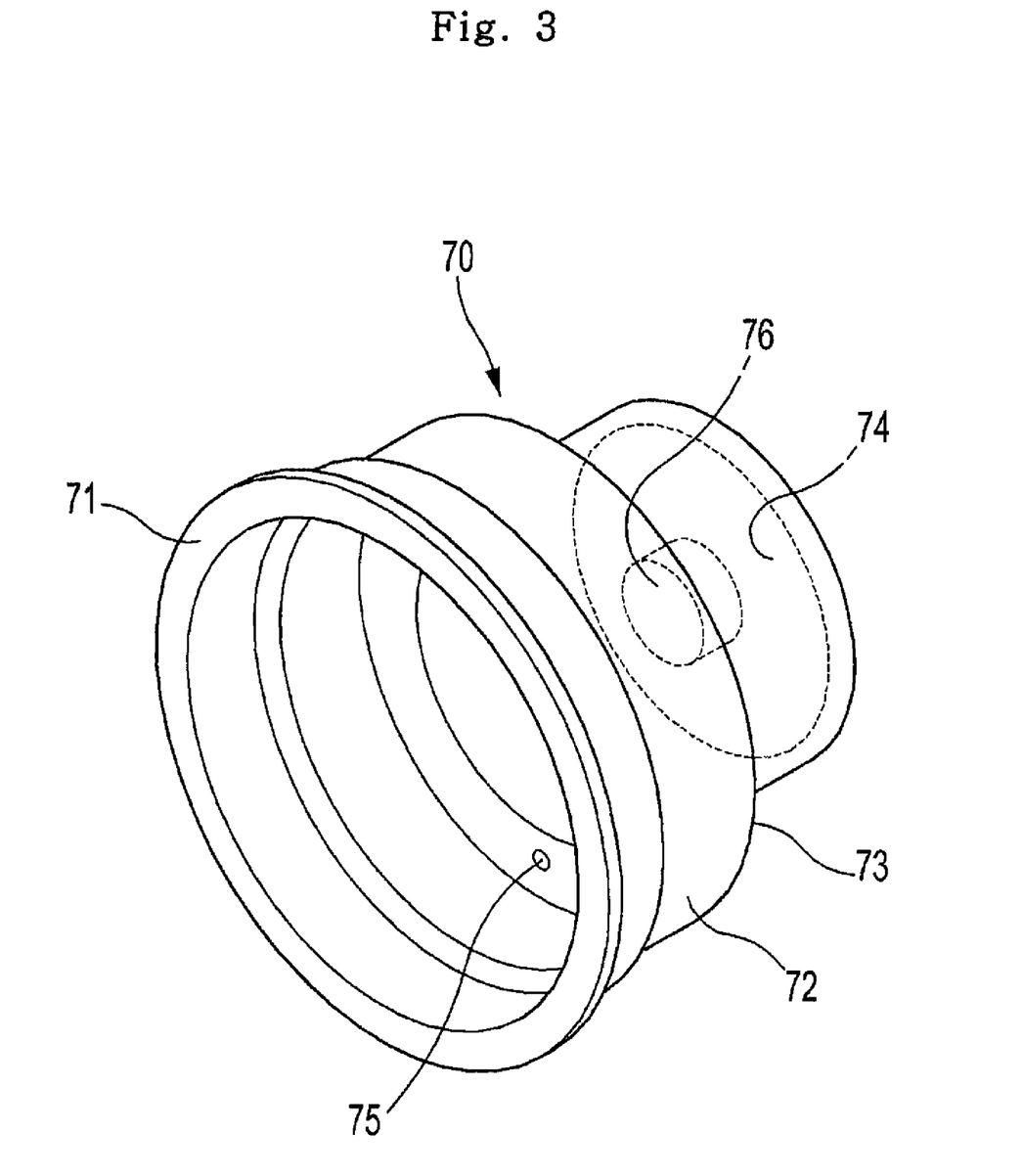
FIG. 3 is a perspective view of a sleeve included in the pump shown in FIG. 2.

FIG. 2 is a sectional view showing a pump of an electronically controlled brake system in accordance with a first embodiment of the present invention. FIG. 3 is a perspective view of a sleeve included in the pump shown in FIG. 2.

As shown in FIG. 2, an electronically controlled brake system according to the present invention basically includes a pair of piston pumps 40, which are arranged opposite to each other about an eccentric spindle 30 of a motor 31. The pumps 40 perform pumping operations, having a phase difference of 180° from each other, when the eccentric spindle 30 of the motor 31 rotates eccentrically. Since the pair of piston pumps 40, arranged in a line, have the same configuration as each other, hereinafter, only one of the piston pumps 40 will be described for clarity of description.

The piston pump 40 is inserted in a bore 35 defined in a modulator block 32 to rectilinearly reciprocate in the bore 35 by rotation of the eccentric spindle 30 of the motor 31. The piston pump 40 includes a piston 41 defining an inlet path 42 therein, an inlet valve 50 to open or close an exit-side end of the inlet path 42 according to a position of the piston 41, and an outlet valve 60 provided at an open end of the bore 35, operations of the inlet and outlet valves 50 and 60 being contrary to each other.

The modulator block 32 is formed with a suction port 33 and a discharge port 34. The suction port 33 connects an entrance-side end of the inlet path 42 defined in the piston 41 to a low-pressure accumulator (not shown), and the discharge port 34 connects an entrance-side of a high-pressure accumulator (not shown) to an exit-side of the outlet valve 60.

The piston 41 comes into contact, at one end thereof, with the eccentric spindle 30, such that the piston 41 rectilinearly reciprocates in the bore 35 by rotation of the eccentric spindle 30. The other end of the piston 41 is provided with the inlet valve 50. A seal 43 is provided at an outer circumference of the piston 41, to prevent leakage of oil through a clearance between the outer circumference of the piston 41 and an inner wall of the bore 35. The seal 43 has a ring shape and is fitted in a seating groove 44 dented along the outer circumference of the piston 41.

The inlet valve 50 includes an inlet ball 51, a supporting spring 52 to support the inlet ball 51, and a retainer 53 coupled with the supporting spring 52.

The inlet ball 51 is provided at the exit-side end of the inlet path 42 defined in the piston 41, to open or close the inlet path 42. The retainer 53 is coupled with a stepped portion 46 defined on the outer circumference of the piston 41 around an exit-side end of the piston 41. The supporting spring 52 is interposed between the retainer 53 and the inlet ball 51. The supporting spring 52 elastically pushes the inlet ball 51, to cause the inlet ball 51 to come into close contact with the inlet path 42.

The outlet valve 60 is located, about the piston 41, at an opposite side of the eccentric spindle 30.

The outlet valve 60 includes a valve seat 61 having an outlet path 61a, an outlet ball 62 to open or close the outlet path 61a of the valve seat 61, a sleeve 70 to surround and fix the valve seat 61, a supporting spring 63 interposed between the outlet ball 62 and the sleeve 70, the supporting spring 63 elastically pushing the outlet ball 62 to cause the outlet ball 62 to come into close contact with the valve seat 61, and a valve cap 64 provided at the rear side of the sleeve 70 to isolate an interior from an exterior of the bore 35.

A return spring 47 is interposed between the retainer 53 of the inlet valve 50 and the valve seat 61 of the outlet valve 60 and is used to elastically push the piston 41 toward the eccentric spindle 30. A piston guide 45 is installed in the bore 35 around an outer circumference of the return spring 47 and is used to guide reciprocation of the piston 41.

As can be seen from FIG. 3 illustrating the sleeve 70, which is included in the outlet valve 60 of the pump 40 according to the present invention, the sleeve 70 has a hollow cylindrical form. One end of the sleeve 70 is formed with a fixing portion 71 to be coupled with the piston guide 45. The sleeve 70 includes a first coupling portion 72 extending from the fixing portion 71 to surround the valve seat 61 at an inner circumferential surface thereof, and a second coupling portion 74 stepped relative to the first coupling portion 72 to have a smaller inner diameter than that of the first coupling portion 72, the first and second coupling portions 72 and 74 being separated from each other about a stepped portion 73 therebetween. An outer circumferential surface of the second coupling portion 74 is fixedly coupled to an inner circumferential surface of the valve cap 64. The other end of the sleeve 70 is formed with an inwardly protruding guide 76 to guide installation of the supporting spring 63.

The stepped portion 73 of the sleeve 70 has one surface fixedly attached to the valve seat 61 and the other surface fixedly attached to the valve cap 64. The stepped portion 73 is formed with an orifice 75, to allow fluid, discharged through the outlet path 61a, to flow to the discharge port 34 through the orifice 75. The orifice 75 has the function of reducing pulsation of the fluid discharged through the outlet path 61a.

By virtue of the fact that the sleeve 70 is formed between the valve seat 61 and the valve cap 64 by press-forming of a relatively thin panel and is provided with the orifice 75 and a flow path to allow the fluid to be discharged to the discharge port 34, the outlet valve 60 of the present invention can achieve a relatively simplified configuration, as compared to the prior art's requirement of provision of a fluid path and an orifice between a valve seat and a valve cap.

Further, the use of the sleeve 70 according to the present invention has the effect of simplifying the configurations of the valve seat 61 and valve cap 64, and allowing the valve seat 61 and valve cap 64 to be formed by a non-cutting method such as forging, press-forming, or the like. As a result, the outlet valve 60 of the present invention can achieve improved assembly efficiency and reduced manufacturing costs.

Hereinafter, operation of the pump of an electronically controlled brake system in accordance with the first embodiment of the present invention having the above-described configuration will be described in detail.

Upon operation of the brake system, when the piston 41 is moved toward the valve cap 64 by rotation of the eccentric spindle 30 connected to the motor 31 and reaches a top dead point, the inlet path 42 is closed by the inlet ball 51, and consequently, a fluid pressure in a pressure chamber 48 defined between the inlet valve 50 and the outlet valve 60 increases. With the increased fluid pressure, the outlet ball 62 is pushed backward, and the outlet path 61a is opened. Thereby, the fluid in the pressure chamber 48 is introduced, through the open outlet path 61a, into a space between the valve seat 61 and the sleeve 70, and subsequently, is discharged to the discharge port 34 of the modulator block 32 through the orifice 75 provided at the stepped portion 73.

Conversely, when the piston 41 is moved toward the eccentric spindle 30 and reaches a bottom dead point, the outlet ball 62 closes the outlet path 61a, creating negative pressure in the pressure chamber 48. As the inlet ball 51 is moved by the negative pressure to open the inlet path 42, fluid is introduced into the inlet path 42 through the suction port 33 of the modulator block 32.

Now, a second embodiment of the present invention will be described in detail with reference to the accompanying drawings.

Figure 4:
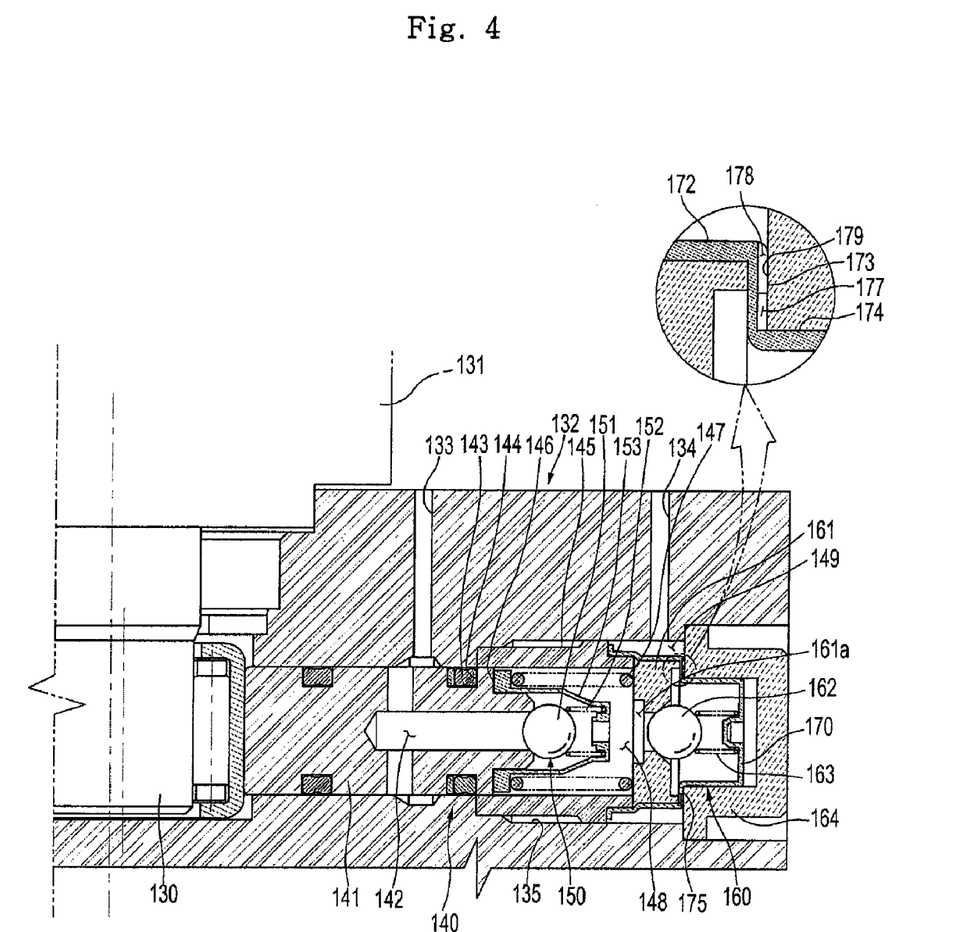
FIG. 4 is a sectional view showing a pump of an electronically controlled brake system in accordance with a second embodiment of the present invention.
Figure 5:
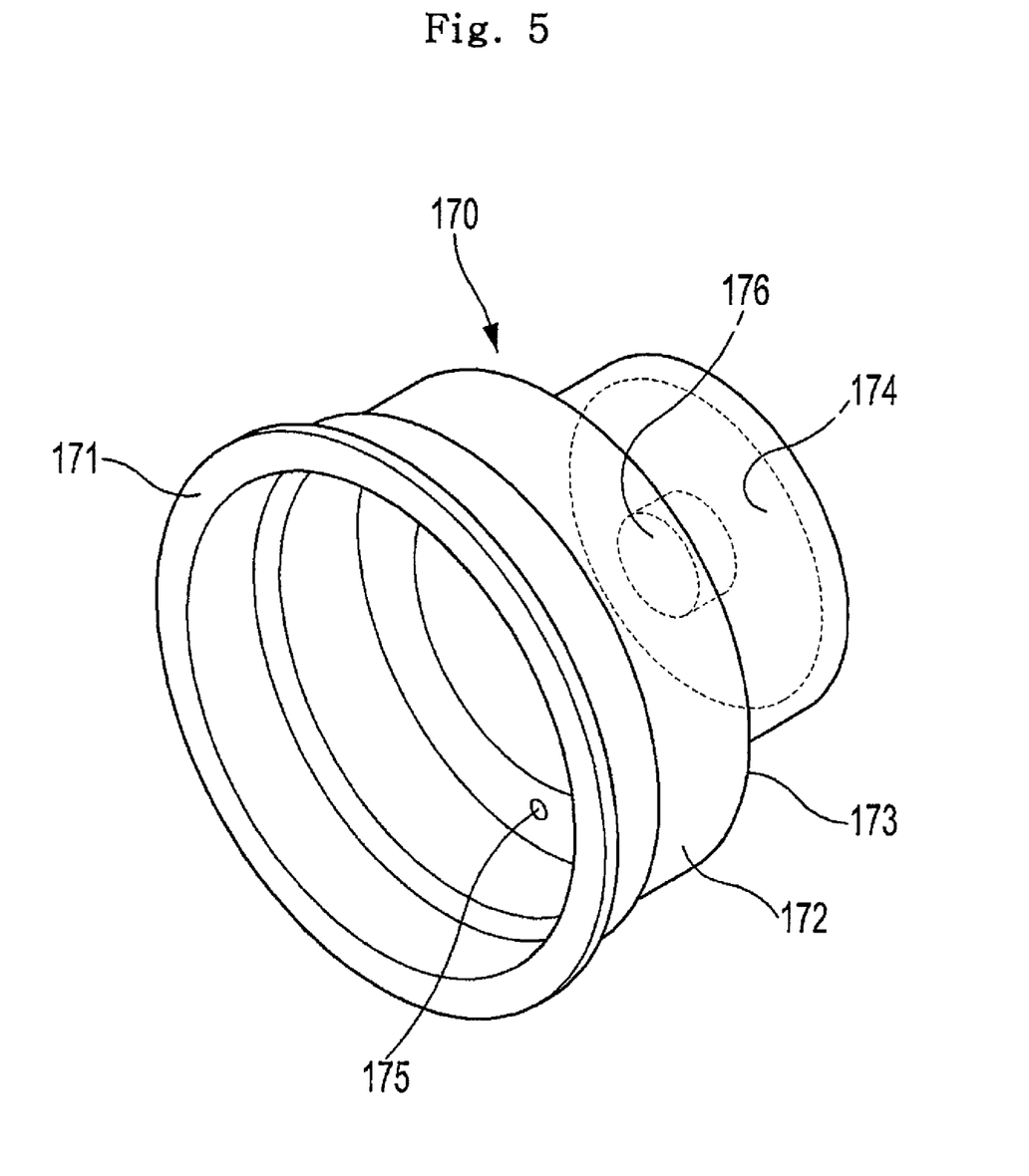
FIG. 5 is a perspective view of a sleeve included in the pump shown in FIG. 4.
Figure 6:
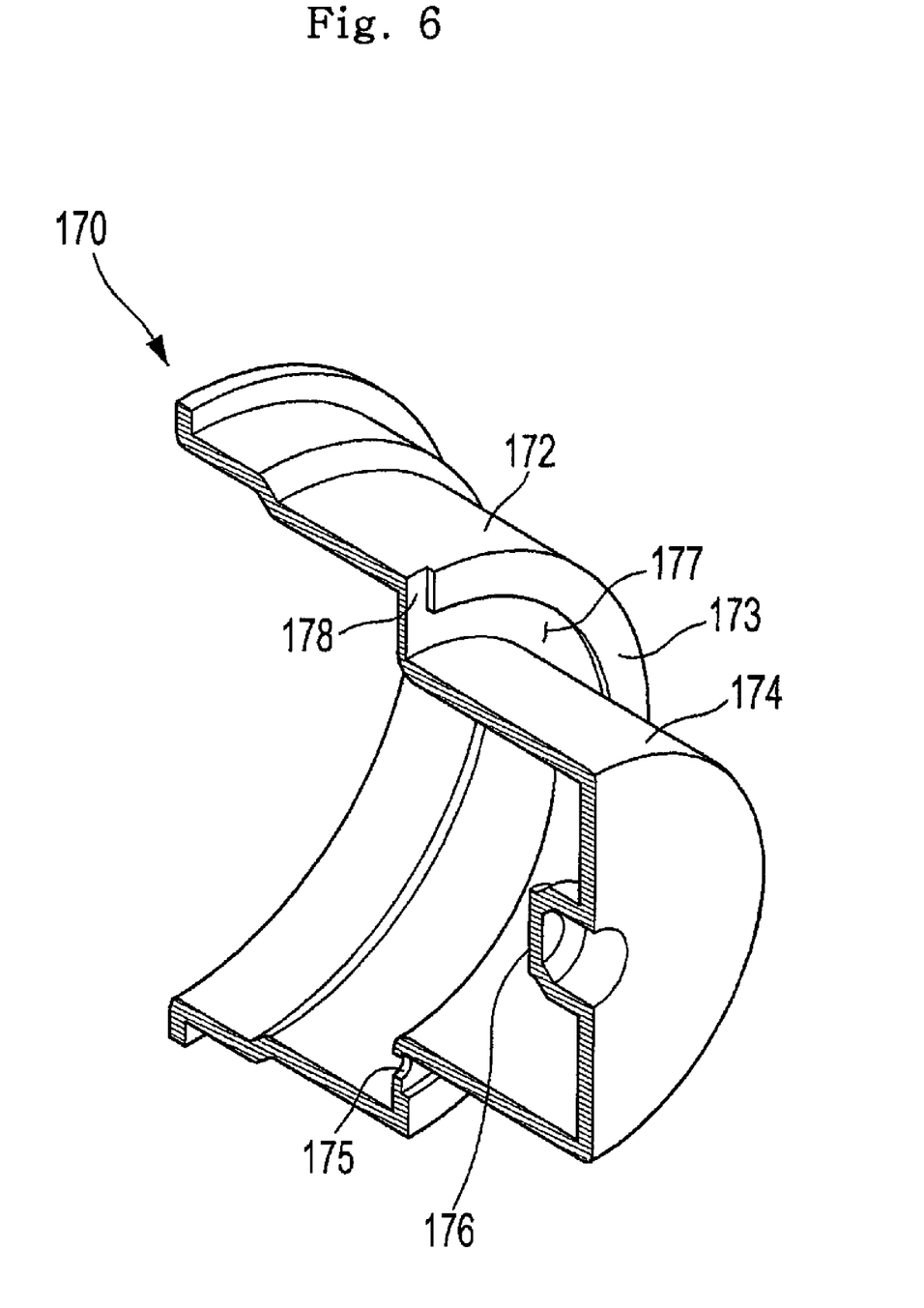
FIG. 6 is a perspective view of the sleeve shown in FIG. 5, as seen from a different angle than in FIG. 5.

FIG. 4 is a sectional view showing a pump of an electronically controlled brake system in accordance with a second embodiment of the present invention. FIG. 5 is a perspective view of a sleeve included in the pump shown in FIG. 4. FIG. 6 is a perspective view of the sleeve shown in FIG. 5, as seen from a different angle than in FIG. 5.

As shown in FIG. 4, an electronically controlled brake system according to the second embodiment of the present invention basically includes a pair of piston pumps 140, which are arranged opposite to each other about an eccentric spindle 130 of a motor 131. The pumps 140 perform pumping operations, having a phase difference of 180° from each other, when the eccentric spindle 130 of the motor 131 rotates eccentrically. Since the pair of piston pumps 140, arranged in a line, have the same configuration as each other, hereinafter, only one of the piston pumps 140 will be described for clarity of description.

The piston pump 140 is inserted in a bore 135 defined in a modulator block 132 to rectilinearly reciprocate in the bore 35 by rotation of the eccentric spindle 130 of the motor 131. The piston pump 140 includes a piston 141 defining an inlet path 142 therein, an inlet valve 150 to open or close an exit-side end of the inlet path 142 according to a position of the piston 141, and an outlet valve 160 provided at an open end of the bore 135, operations of the inlet and outlet valves 150 and 160 being contrary to each other.

The modulator block 132 is formed with a suction port 133 and a discharge port 134. The suction port 133 connects an entrance-side end of the inlet path 142 defined in the piston 141 to a low-pressure accumulator (not shown), and the discharge port 134 connects an entrance-side of a high-pressure accumulator (not shown) to an exit-side of the outlet valve 160.

The piston 141 comes into contact, at one end thereof, with the eccentric spindle 130, such that the piston 41 rectilinearly reciprocates in the bore 135 by rotation of the eccentric spindle 130. The other end of the piston 141 is provided with the inlet valve 150. A seal 143 is provided at an outer circumference of the piston 141, to prevent leakage of oil through a clearance between the outer circumference of the piston 141 and an inner wall of the bore 135. The seal 143 has a ring shape, and is fitted in a seating groove 144 dented along the outer circumference of the piston 141.

The inlet valve 150 includes an inlet ball 151, a supporting spring 152 to support the inlet ball 151, and a retainer 153 coupled with the supporting spring 152.

The inlet ball 151 is provided at the exit-side end of the inlet path 142 defined in the piston 141, to open or close the inlet path 142. The retainer 153 is coupled with a stepped portion 146 defined on the outer circumference of the piston 141 around an exit-side end of the piston 141. The supporting spring 152 is interposed between the retainer 153 and the inlet ball 151. The supporting spring 152 elastically pushes the inlet ball 151, to cause the inlet ball 151 to come into close contact with the inlet path 142.

The outlet valve 160 is located, about the piston 141, at an opposite side of the eccentric spindle 130.

The outlet valve 160 includes a valve seat 161 having an outlet path 161a, an outlet ball 162 to open or close the outlet path 161a of the valve seat 161, a sleeve 170 to surround and fix the valve seat 161, a supporting spring 163 interposed between the outlet ball 162 and the sleeve 170, the supporting spring 163 elastically pushing the outlet ball 162 to cause the outlet ball 162 to come into close contact with the valve seat 161, and a valve cap 164 provided at the rear side of the sleeve 170 to isolate an interior from an exterior of the bore 135.

A return spring 147 is interposed between the retainer 153 of the inlet valve 150 and the valve seat 161 of the outlet valve 160 and is used to elastically push the piston 141 toward the eccentric spindle 130. A piston guide 145 is installed in the bore 135 around an outer circumference of the return spring 147 and is used to guide reciprocation of the piston 141.

As can be seen from FIG. 5 illustrating the sleeve 170, which is included in the outlet valve 160 of the pump 140 according to the present embodiment, the sleeve 170 has a hollow cylindrical form. One end of the sleeve 170 is formed with a fixing portion 171 to be coupled with the piston guide 145. The sleeve 170 includes a first coupling portion 172 extending from the fixing portion 171 to surround the valve seat 161 at an inner circumferential surface thereof, and a second coupling portion 174 stepped relative to the first coupling portion 172 to have a smaller inner diameter than that of the first coupling portion 172, the first and second coupling portions 172 and 174 being separated from each other about a stepped portion 173 therebetween. An outer circumferential surface of the second coupling portion 174 is fixedly coupled to an inner circumferential surface of the valve cap 164. The other end of the sleeve 170 is formed with an inwardly protruding guide 176 to guide installation of the supporting spring 163.

The stepped portion 173 of the sleeve 170 has one surface fixedly attached to the valve seat 161 and the other surface fixedly attached to the valve cap 164. The stepped portion 173 is formed with an orifice 175, to allow fluid, discharged through the outlet path 161a, to flow to the discharge port 134 through the orifice 175.

The stepped portion 173 of the sleeve 170, as shown in FIG. 6, is formed with an annular discharge groove 177 having a predetermined depth. The orifice 175 is located in the discharge groove 177. The discharge groove 177 guides fluid, delivered from the outlet path 161a according to opening/closing operations of the outlet ball 162, to the discharge port 134. With the provision of the discharge groove 177, a space, which is defined as the stepped portion 173 is coupled with a front surface of the valve cap 164, forms a discharge path 179.

A discharge hole 178 extends in a radial direction from any one or more positions of the discharge groove 177, to allow fluid, moving through the discharge path 179, to be discharged into a discharge chamber 149 defined between an inner circumferential surface of the bore 135 and an outer circumferential surface of the first coupling portion 172 of the sleeve 170. Once introduced into the discharge chamber 149, the fluid is discharged to a high-pressure accumulator (not shown) through the discharge port 134.

The above-described discharge groove 177 of the sleeve 170 has the effect of significantly reducing pulsation of fluid caused when the outlet path 161a is opened or closed by the outlet ball 162, and consequently, reducing operation noise of the piston pump 140 and improving tactile feedback from a brake pedal.

The sleeve 170 according to the present invention can be formed between the valve seat 161 and the valve cap 164 by press-forming of a relatively thin panel to allow the fluid to be discharged to the discharge port 134 through the orifice 175 and discharge groove 177 thereof. Accordingly, the outlet valve 160 of the present invention can achieve a relatively simplified configuration, as compared to the prior art's requirement of provision of a fluid path and an orifice between a valve seat and a valve cap.

Further, the use of the sleeve 170 according to the present invention has the effect of simplifying the configurations of the valve seat 161 and valve cap 164, and allowing the valve seat 161 and valve cap 164 to be formed by forging or press-forming. As a result, the outlet valve 60 of the present invention can achieve improved assembly efficiency and reduced manufacturing costs.

Hereinafter, operation of the pump of an electronically controlled brake system in accordance with the second embodiment of the present invention having the above-described configuration will be described in detail.

Upon operation of the brake system, when the piston 141 is moved toward the valve cap 164 by rotation of the eccentric spindle 130 connected to the motor 131 and reaches a top dead point, the inlet path 142 is closed by the inlet ball 151, and consequently, a fluid pressure in a pressure chamber 148 defined between the inlet valve 150 and the outlet valve 160 increases. With the increased fluid pressure, the outlet ball 162 is pushed backward, and the outlet path 161a is opened. Thereby, the fluid in the pressure chamber 148 is introduced, through the open outlet path 161a, into a space between the valve seat 161 and the sleeve 170, and subsequently, is discharged into the discharge groove 177 through the orifice 175 formed at the stepped portion 173. Thereby, the fluid flows in an annular trajectory through the discharge path 179 defined in the space between the discharge groove 177 and the front surface of the valve cap 164. In this case, after being introduced into the discharge chamber 149 through the discharge hole 178 extending from the discharge groove 177, the fluid is discharged to a high-pressure accumulator (not shown) through the discharge port 134.

Conversely, when the piston 141 is moved toward the eccentric spindle 130 and reaches a bottom dead point, the outlet ball 162 closes the outlet path 161a, creating negative pressure in the pressure chamber 148. As the inlet ball 151 is moved by the negative pressure to open the inlet path 142, fluid is introduced into the inlet path 142 through the suction port 133 of the modulator block 132.

Now, a third embodiment of the present invention will be described in detail with reference to the accompanying drawings.

Figure 7:
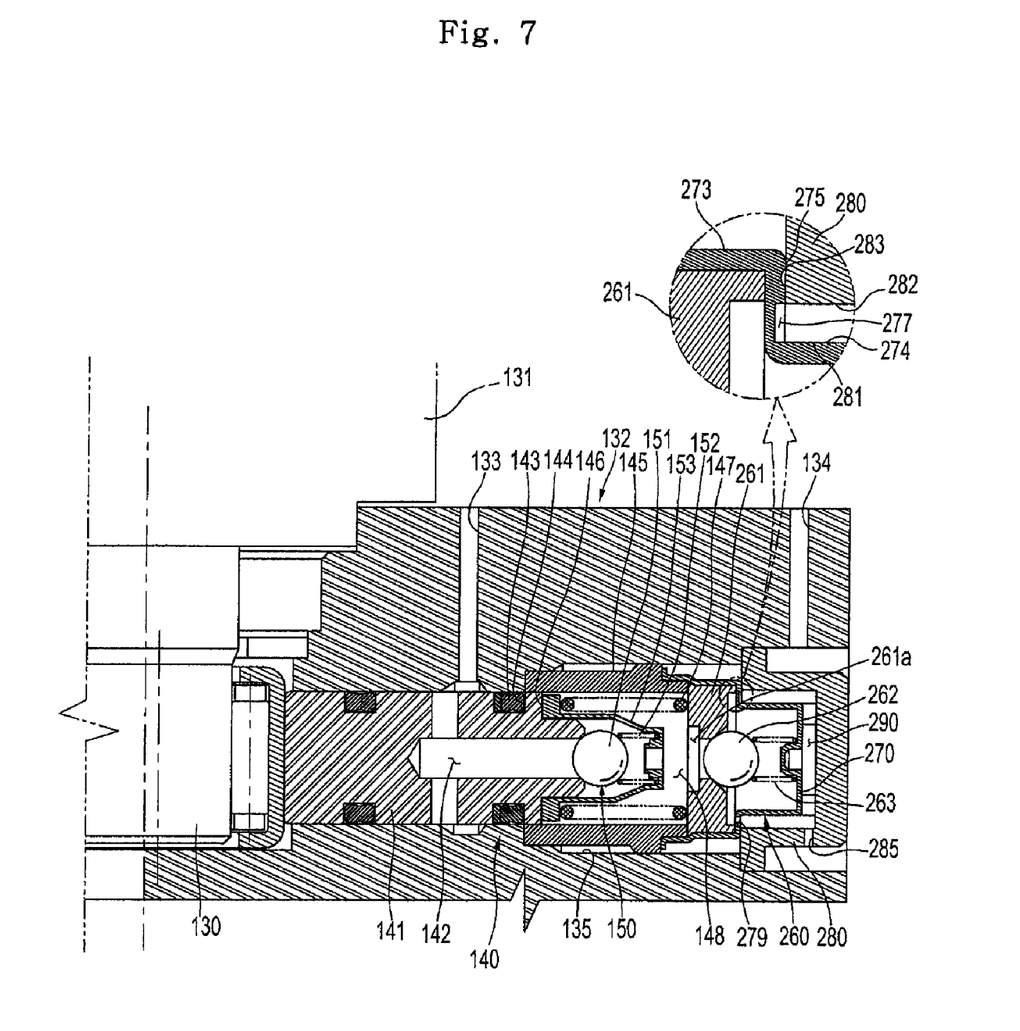
FIG. 7 is a sectional view showing a pump of an electronically controlled brake system in accordance with a third embodiment of the present invention.
Figure 8:
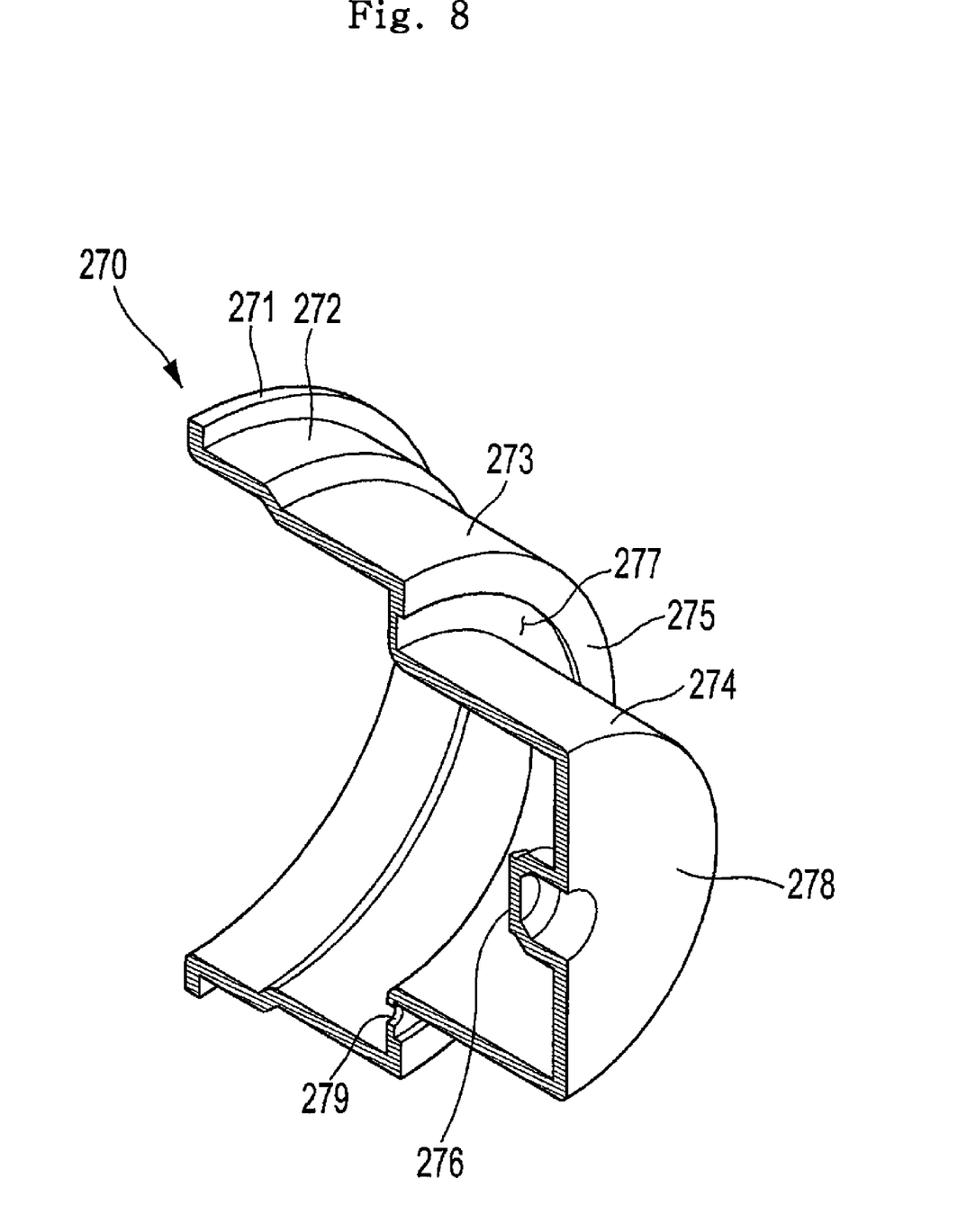
FIG. 8 is a sectional perspective view of a sleeve included in the pump shown in FIG. 7.
Figure 9:
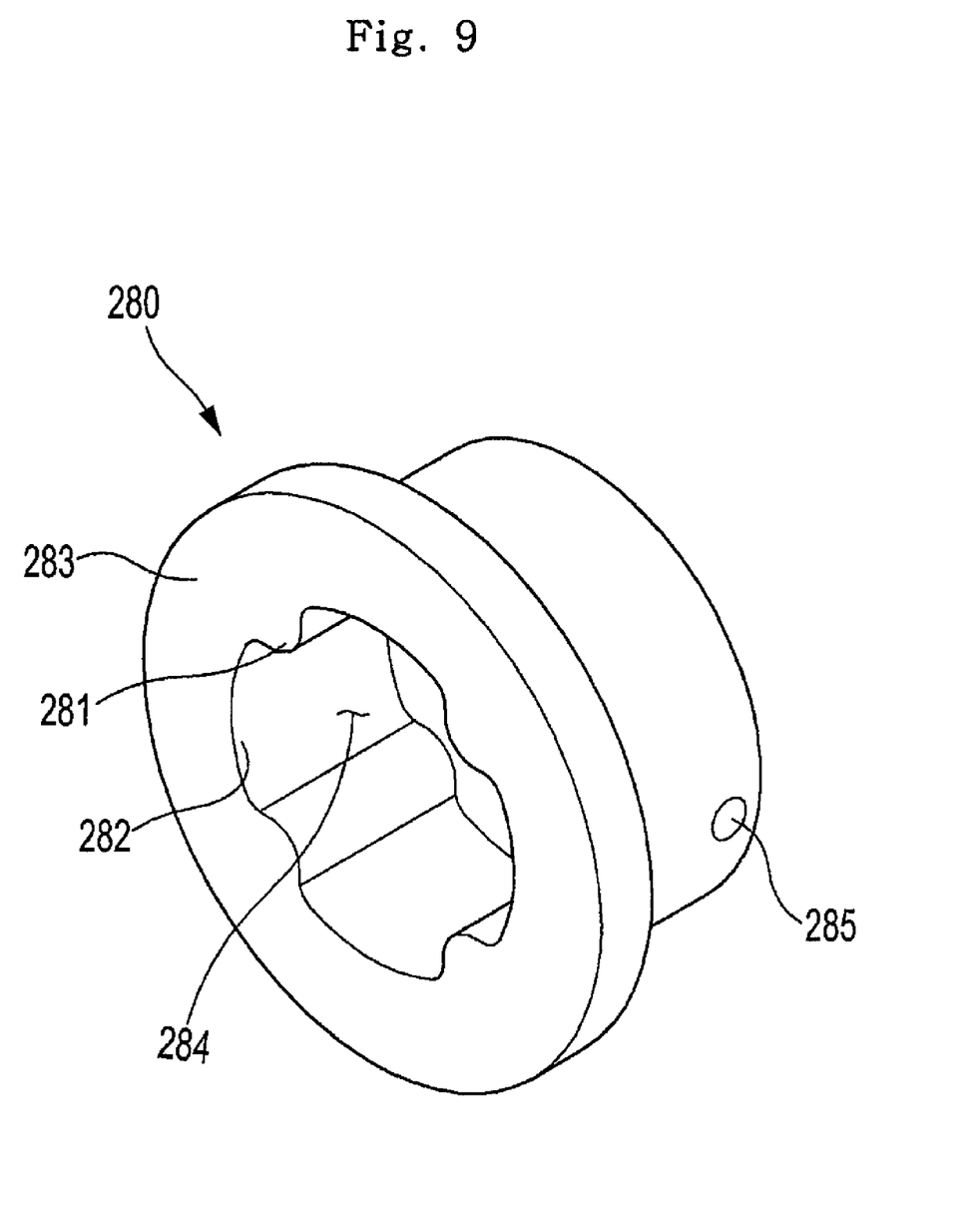
FIG. 9 is a perspective view of a valve cap included in the pump shown in FIG. 7.

FIG. 7 is a sectional view showing a pump of an electronically controlled brake system in accordance with a third embodiment of the present invention. FIG. 8 is a sectional perspective view of a sleeve included in the pump shown in FIG. 7. FIG. 9 is a perspective view of a valve cap included in the pump shown in FIG. 7.

The third embodiment of the present invention is identical to the above-described second embodiment except for the configuration of the outlet valve. Therefore, the same configurations as those of the second embodiment are designated by the same reference numerals, and a description thereof will be omitted.

In the pump of an electronically controlled brake system according to the third embodiment of the present invention, as shown in FIG. 7, an outlet valve 260 is located, about the piston 141, at an opposite side of the eccentric spindle 130.

The outlet valve 260 includes a valve seat 261 having an outlet path 261a, an outlet ball 262 to open or close the outlet path 261a of the valve seat 261, a sleeve 270 to surround and fix the valve seat 261, a supporting spring 263 interposed between the outlet ball 262 and the sleeve 270, the supporting spring 263 elastically pushing the outlet ball 262 to cause the outlet ball 262 to come into close contact with the valve seat 261, and a valve cap 280 provided at the rear side of the sleeve 270 to isolate the interior from the exterior of the bore 135.

The return spring 147 is interposed between the retainer 153 of the inlet valve 150 and the valve seat 261 of the outlet valve 260 and is used to elastically push the piston 141 toward the eccentric spindle 130. The piston guide 145 is installed in the bore 135 around the outer circumference of the return spring 147 and is used to guide reciprocation of the piston 141.

As can be seen from FIG. 8 illustrating the sleeve 270, which is included in the outlet valve 260 of the pump 140 according to the third embodiment of the present invention, the sleeve 270 has a hollow cylindrical form. One end of the sleeve 270 is formed with a fixing portion 271 coupled with the piston guide 145. The sleeve 270 includes a first coupling portion 272 extending from the fixing portion 271 to surround the piston guide 145 at an inner circumferential surface thereof, a second coupling portion 274 provided at the rear side of the first coupling portion 272 to surround the outer diameter portion of the valve seat 261, and a third coupling portion 274 provided at the rear side of the second coupling portion 273 and stepped relative to the second coupling portion 273 to have a smaller inner diameter than that of the second coupling portion 273, the third coupling portion 274 being separated from the second coupling portion 273 about a stepped portion 275. An outer circumferential surface of the third coupling portion 274 is fixedly coupled with an inner circumferential surface of the valve cap 280 shown in FIG. 9. The sleeve 270 is formed, at a rear surface 278 thereof, with an inwardly protruding guide 276 to guide installation of the supporting spring 263.

As shown in FIG. 7, the stepped portion 275 of the sleeve 270 has one surface fixedly attached to the valve seat 261 and the other surface fixedly attached to a front surface 283 of the valve cap 280. The stepped portion 275 is formed with an annular discharge groove 277 having a predetermined depth for passage of fluid discharged through the outlet path 261a. The discharge groove 277 is provided with an orifice 279, into which the fluid, having passed through the outlet path 261a, is introduced. The discharge groove 277 guides the fluid, delivered from the outlet path 261a according to opening/closing operations of the outlet ball 262, to a damping region 290 that will be described hereinafter, and thus, has the function of reducing pulsation of fluid.

The valve cap 280 provided at the rear side of the sleeve 270 isolates the interior from the exterior of the bore 135 to hermetically seal the piston pump 40. As shown in FIG. 9, the valve cap 280 has a hollow interior space 284 such that the third coupling portion 274 of the sleeve 270 is inserted into the hollow space 284 and fixed to the bore 135. In this case, the stepped portion 275 of the sleeve 270 is coupled with the front surface 283 of the valve cap 280, and the third coupling portion 274 of the sleeve 270 is coupled with a plurality of protrusions 281 of the valve cap 280. A plurality of grooves 282 are defined between the respective neighboring protrusions 281, to guide the fluid from the discharge groove 277 to the damping region 290 through the grooves 282.

The hollow space 284 of the valve cap 280 has a longer length than that of the third coupling portion 274 of the sleeve 270. Accordingly, when the valve cap 280 and the sleeve 270 are coupled with each other, the damping region 290 having a predetermined volume is defined in a rear region of the hollow space 284. The damping region 290 allows the fluid, discharged through the outlet valve 260, to temporarily stay therein, thereby functioning to reduce damping pulsation of fluid. Since the sleeve 270 is formed by press-forming of a thin panel, the rear surface of the sleeve 270 can be elastically deformed by a pressure difference between a space defined between the valve seat 261 and the sleeve 270 and the damping region 290. As a result, the sleeve 270 can absorb pulsation of fluid and consequently, vibration caused by pulsation of fluid.

The damping region 290 is formed with a discharge hole 285 to discharge the fluid to the discharge port 134. Thereby, the fluid can be discharged from the damping region 290 to a high-pressure accumulator (not shown) through the discharge port 134.

With the use of the damping region 290 having the above-described configuration, the present embodiment has the effect of significantly reducing pulsation of fluid caused when the outlet path 261a is opened or closed by the outlet ball 262, and consequently, reducing operation noise of the piston pump 140 and improving tactile feedback from a brake pedal.

Hereinafter, operation of the pump of an electronically controlled brake system in accordance with the third embodiment of the present invention having the above-described configuration will be described in detail.

Upon operation of the brake system, when the piston 141 is moved toward the valve cap 280 by rotation of the eccentric spindle 130 connected to the motor 131 and reaches a top dead point, the inlet path 142 is closed by the inlet ball 151, and consequently, a fluid pressure in a pressure chamber 148 defined between the inlet valve 150 and the outlet valve 260 increases. With the increased fluid pressure, the outlet ball 262 is pushed backward, and the outlet path 261a is opened. Thereby, the fluid in the pressure chamber 148 is introduced, through the open outlet path 261a, into a space between the valve seat 261 and the sleeve 270, and subsequently, is discharged into the discharge groove 277 through the orifice 279 formed at the stepped portion 275. Thereby, the fluid in the discharge groove 277 is introduced into the damping region 290 through the grooves 282 of the valve cap 280. In this case, the fluid in the damping region 290 is discharged to the discharge port 134 through the discharge hole 285, so as to be moved to a high-pressure accumulator (not shown).

Conversely, when the piston 141 is moved toward the eccentric spindle 130 and reaches a bottom dead point, the outlet ball 262 closes the outlet path 261a, creating negative pressure in the pressure chamber 148. As the inlet ball 151 is moved by the negative pressure to open the inlet path 142, fluid is introduced into the inlet path 142 through the suction port 133 of the modulator block 132.

As apparent from the above description, the present invention provides a pump of an electronically controlled brake system, in which constituent elements of an outlet valve, more particularly, a sleeve, valve cap, etc. can be formed in a simplified configuration. This allows these elements to be manufactured in a relatively simplified method such as press-forming, etc., and has the effect of reducing manufacturing costs of the outlet valve.

Further, according to the present invention, the sleeve has a discharge groove to define a discharge path between the sleeve and a front surface of the valve cap. The use of the discharge path has the effects of reducing pulsation of fluid discharged from the outlet valve, and consequently, reducing operation noise of the pump.

Furthermore, as a result of providing a damping region between the sleeve and the valve cap, the present invention can achieve a further reduction in pulsation of the fluid discharged from the outlet valve, and consequently, reduce operation noise of the pump.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pump of an electronically controlled brake system comprising:
a bore formed in a modulator block and connected with a suction port and a discharge port; a piston installed in the bore in a reciprocating movable manner and defining an inlet path therein; an inlet valve to open or close an exit-side end of the inlet path according to a position of the piston; and an outlet valve provided at one side of the bore, operations of the inlet and outlet valves being contrary to each other,
wherein the outlet valve comprises: a valve seat; a sleeve to surround the valve seat; an outlet ball interposed between the sleeve and the valve seat and used to open or close a path defined in the valve seat; and a valve cap provided at one side of the sleeve to isolate an interior from an exterior of the bore,
wherein a damping region is formed between the sleeve and the valve cap to reduce pulsation of fluid, and
wherein at least one groove is formed in an inner circumferential surface of the valve cap, said at least one groove arranged to guide fluid from the path to the damping region.

2. The pump according to claim 1, wherein a discharge path is defined in a surface of the sleeve coming in contact with the valve cap.

3. The pump according to claim 2, wherein the at least one groove connects the discharge path with the damping region.

4. The pump according to claim 2, wherein the sleeve comprises an orifice to introduce fluid into the discharge path.

5. The pump according to claim 1, wherein a surface of the sleeve coming in contact with the damping region is elastically deformed by a pressure difference between an interior and an exterior of the sleeve.

6. The pump according to claim 2, wherein the at least one groove comprises plural grooves.

7. The pump according to claim 2, wherein the at least one groove is arranged between circumferentially adjacent protrusions extending from the valve cap.

8. The pump according to claim 7, wherein said protrusions are coupled to said sleeve.

9. The pump according to claim 1, wherein the at least one groove comprises plural grooves.

10. The pump according to claim 1, wherein the at least one groove is arranged between circumferentially adjacent protrusions extending from the valve cap.

11. The pump according to claim 10, wherein said protrusions are coupled to said sleeve.

* * * * *